(12) United States Patent
Enamito et al.

(10) Patent No.: US 10,638,249 B2
(45) Date of Patent: Apr. 28, 2020

(54) REPRODUCING APPARATUS

(71) Applicant: KABUSHIKI KAISHA TOSHIBA, Minato-ku (JP)

(72) Inventors: Akihiko Enamito, Kawasaki (JP); Osamu Nishimura, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/288,540

(22) Filed: Feb. 28, 2019

(65) Prior Publication Data
US 2020/0084562 A1 Mar. 12, 2020

(30) Foreign Application Priority Data
Sep. 10, 2018 (JP) .................. 2018-169000

(51) Int. Cl.
*H04S 7/00* (2006.01)
*G06F 3/01* (2006.01)
(Continued)

(52) U.S. Cl.
CPC .............. *H04S 7/303* (2013.01); *B62B 3/14* (2013.01); *G06F 3/013* (2013.01); *G06F 9/542* (2013.01); *H04S 2420/01* (2013.01)

(58) Field of Classification Search
None
See application file for complete search history.

(56) References Cited

U.S. PATENT DOCUMENTS

| 9,789,815 B2 | 10/2017 | Someda et al. |
| 2015/0248897 A1 | 9/2015 | Nakayama |

(Continued)

FOREIGN PATENT DOCUMENTS

| JP | 4282139 | 3/2009 |
| JP | 4715052 | 4/2011 |

(Continued)

OTHER PUBLICATIONS

S. Endo, et al., "Design of mobile evacuation guidance system using acoustic communication and signal arrival direction measurement", Information and Systems Society Special Project, Student Poster Session Proceedings, ISS-SP-001, p. 116, 2018 (with English translation).

(Continued)

*Primary Examiner* — Paul W Huber
(74) *Attorney, Agent, or Firm* — Oblon, McClelland, Maier & Neustadt, L.L.P.

(57) ABSTRACT

A reproducing apparatus includes, a first sensor, processing circuitry, an audio reproducing device, and an image reproducing device. The first sensor detects a current location of a user. The processing circuitry acquires a destination, determines a direction of the destination based on the current location, generates a guidance sound image and a guidance image, and determines a first output timing which is an output timing of the guidance sound image and a second output timing which is an output timing of the guidance image. The audio reproducing device reproduces the guidance sound image at the first output timing to guide the user toward the destination. The image reproducing device reproduces the guidance image at the second output timing to guide the user toward the destination.

10 Claims, 13 Drawing Sheets

(51) Int. Cl.
*G06F 9/54* (2006.01)
*B62B 3/14* (2006.01)

(56) References Cited

U.S. PATENT DOCUMENTS

| 2015/0281867 A1 | 10/2015 | Enamito et al. |
| 2015/0379360 A1* | 12/2015 | Rhee ................. G01C 21/3644 |
| | | 345/633 |
| 2016/0185290 A1 | 6/2016 | Someda et al. |

FOREIGN PATENT DOCUMENTS

| JP | 4817804 | 9/2011 |
| JP | 2015-076797 | 4/2015 |
| JP | 2015-198297 | 11/2015 |
| JP | 5944567 | 6/2016 |
| JP | 2016-125853 | 7/2016 |
| JP | 5966897 | 7/2016 |

OTHER PUBLICATIONS

H. Hashimoto, et al., "A Study of Evacuation Guidance with Voices Using Precedence Effect-Examination of Lateralization by Multiple Guiding Voices from Different Directions", The journal of the academic lecture of Nihon University science and engineering department, L-28, pp. 955-956, 2014 (with English translation).
Y. Ito, "Sound evacuation guidance", Journal of Japan Acoustical Society, vol. 57, No. 10, pp. 675-680, 2001 (with English translation).

* cited by examiner

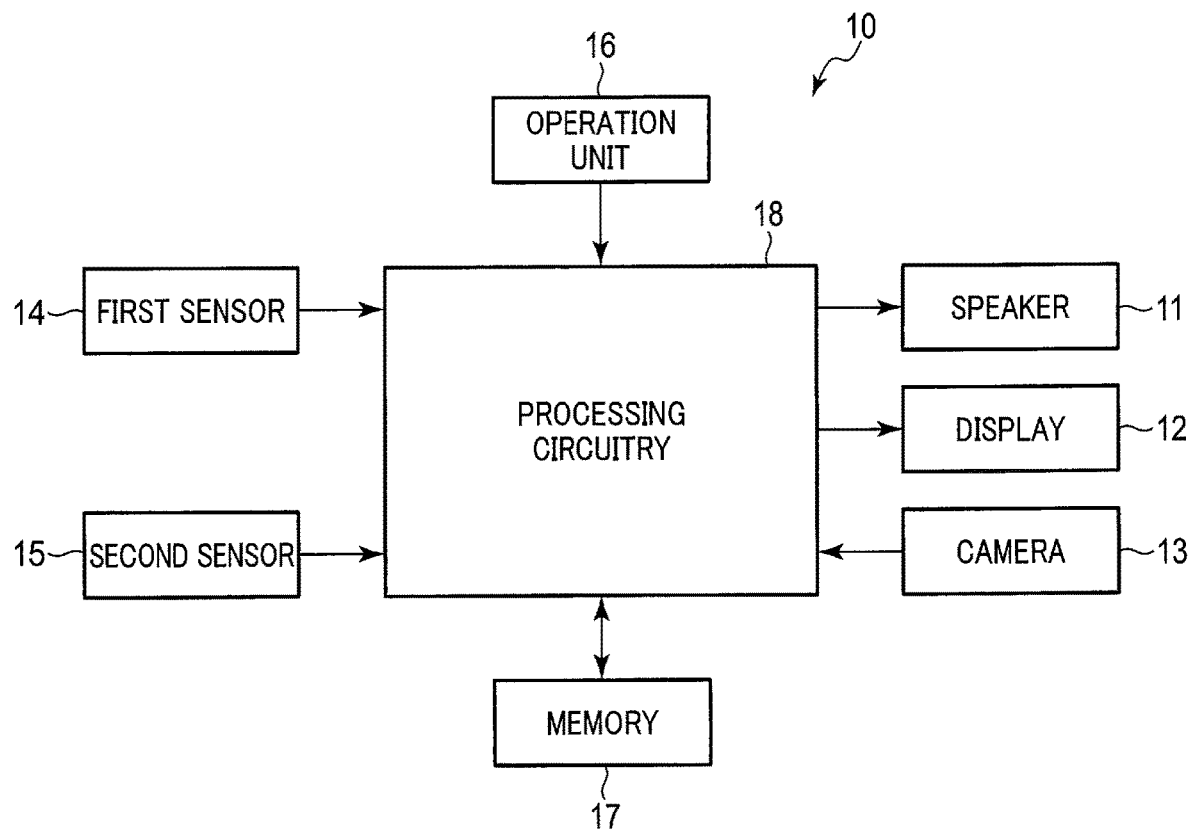
F I G. 1
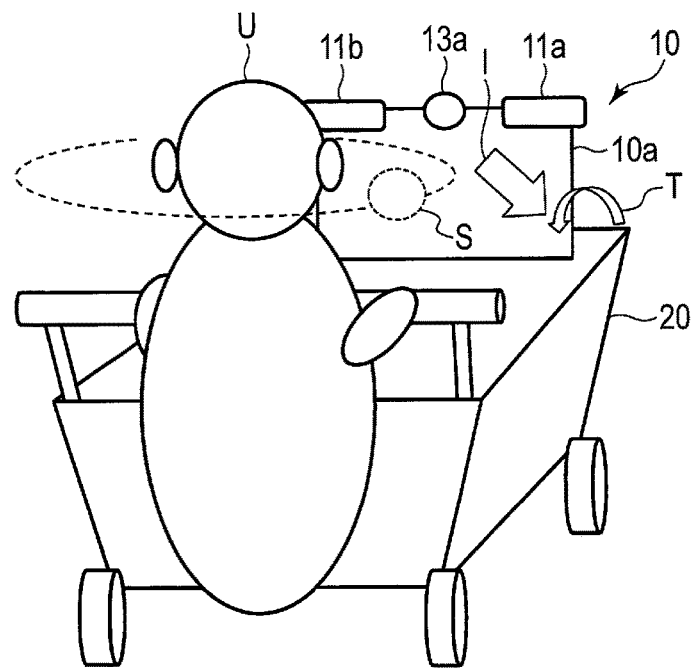
F I G. 2

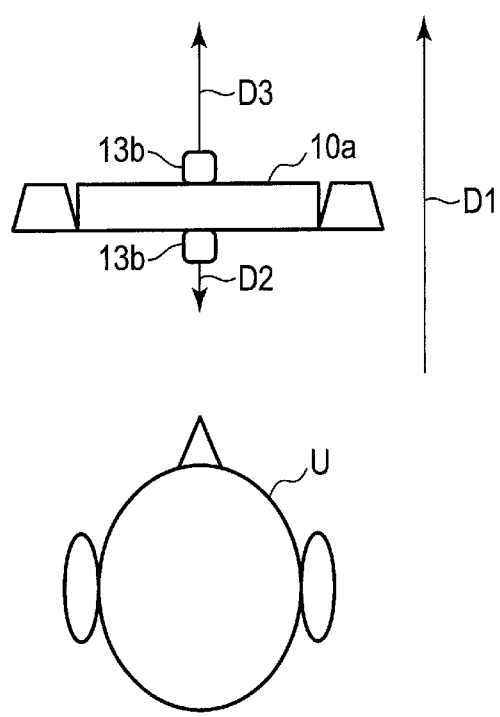
F I G. 3

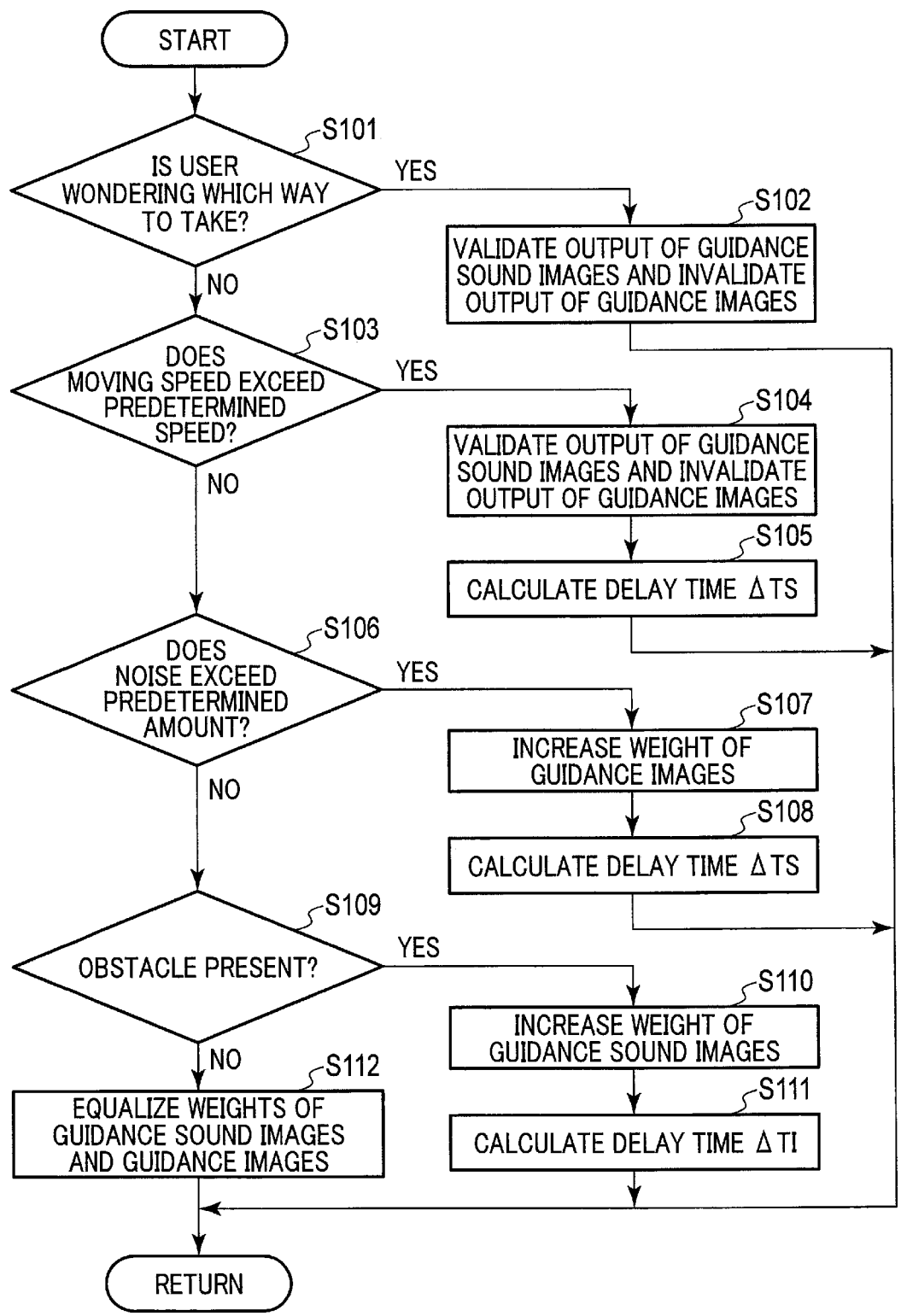
F I G. 6

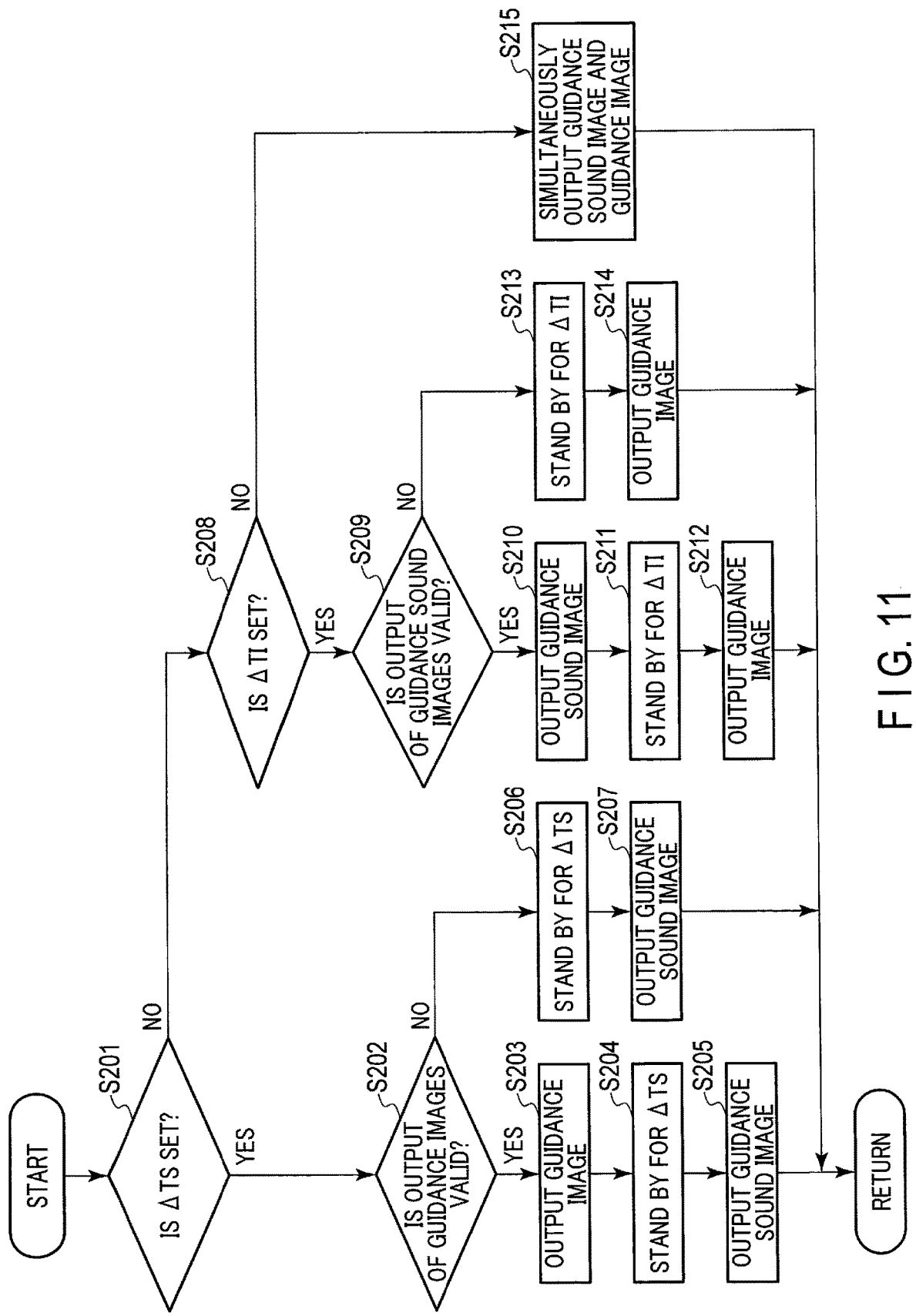
F I G. 11

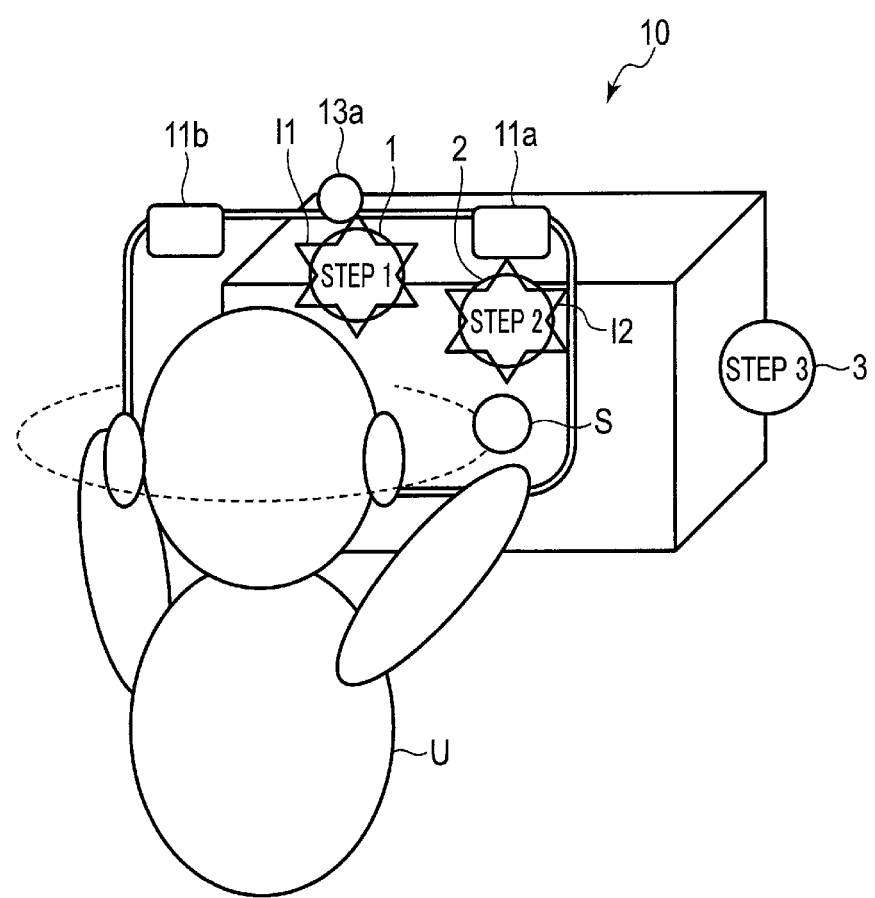
F I G. 15

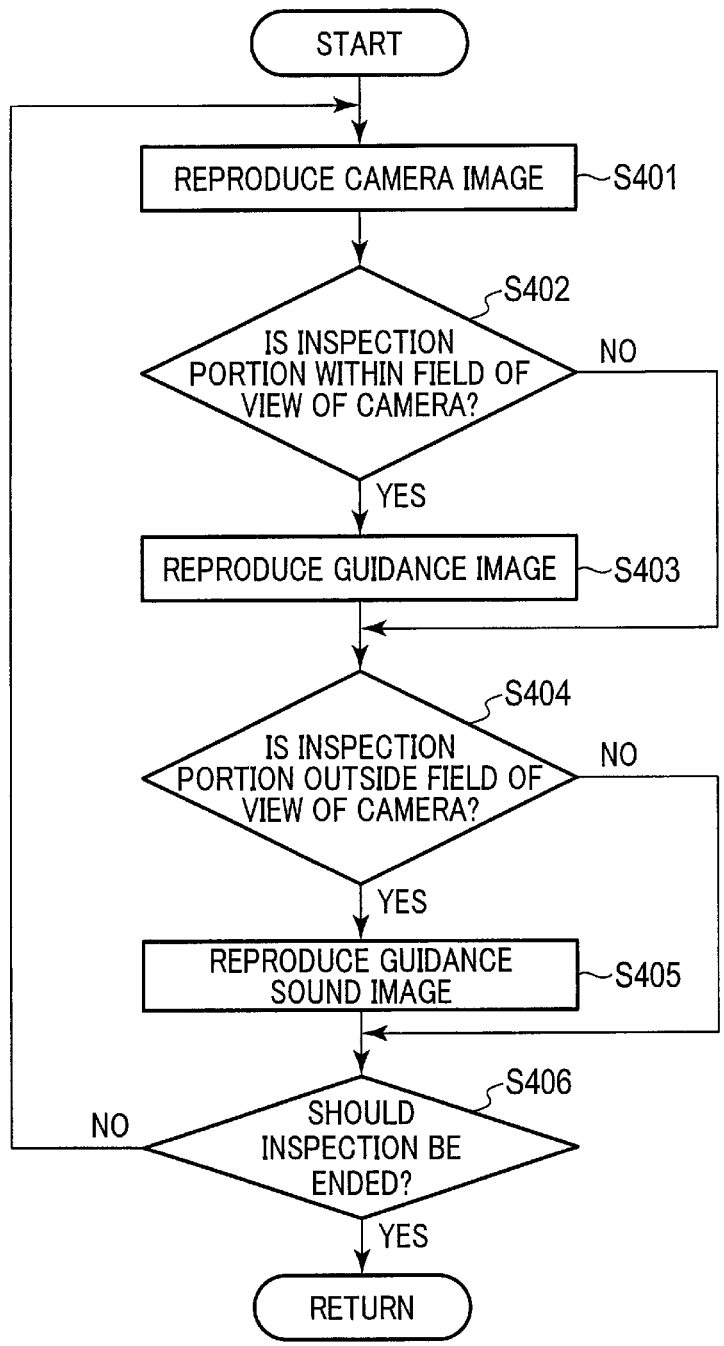
F I G. 16

REPRODUCING APPARATUS

CROSS-REFERENCE TO RELATED APPLICATIONS

This application is based upon and claims the benefit of priority from Japanese Patent Application No. 2018-169000, filed Sep. 10, 2018, the entire contents of which are incorporated herein by reference.

FIELD

Embodiments described herein relate to a reproducing apparatus.

BACKGROUND

There are known techniques for guiding a user in a predetermined direction by the sense of hearing or by calling attention to the predetermined direction. The techniques of this kind include a technique in which a plurality of speakers are arranged in advance along the direction in which the user should move and sounds are output from the respective speakers at shifted output timings to guide the user in the predetermined direction. In a car navigation system or the like, there is known a technique which guides a user in a predetermined direction by outputting a voice indicating a destination on a map to the user. Furthermore, in recent years, a technique is proposed in which a user is guided in a predetermined direction by a sound image localization technique. In the sound image localization technique, for example, a sound volume difference and a phase difference are added to sounds that are input to the right and left ears of a user, such that the user can perceive the sense of distance to a sound source and recognize the position of a virtual sound source.

In order to reliably guide a user to a predetermined place, it is desirable that the guidance based on images is used in addition to the guidance based on sound images.

However, unless the guidance based on images and the guidance based on sound images are effectively linked, the user may be confused.

Accordingly, the present embodiment is intended to provide a reproducing apparatus in which sound images and images are effectively linked.

BRIEF DESCRIPTION OF THE DRAWINGS

FIG. 1 is a diagram showing a configuration of an example of a reproducing apparatus according to each embodiment.

FIG. 2 is a diagram showing an application example of a reproducing apparatus according to the first embodiment.

FIG. 3 is a diagram showing how a first camera and a second camera are arranged.

FIG. 6 is a flowchart illustrating an example of output determination processing.

FIG. 11 is a flowchart illustrating output processing.

FIG. 15 is a diagram showing an application example of a reproducing apparatus according to the second embodiment.

FIG. 16 is a flowchart illustrating an operation of the reproducing apparatus according to the second embodiment.

DETAILED DESCRIPTION

Figure 4:
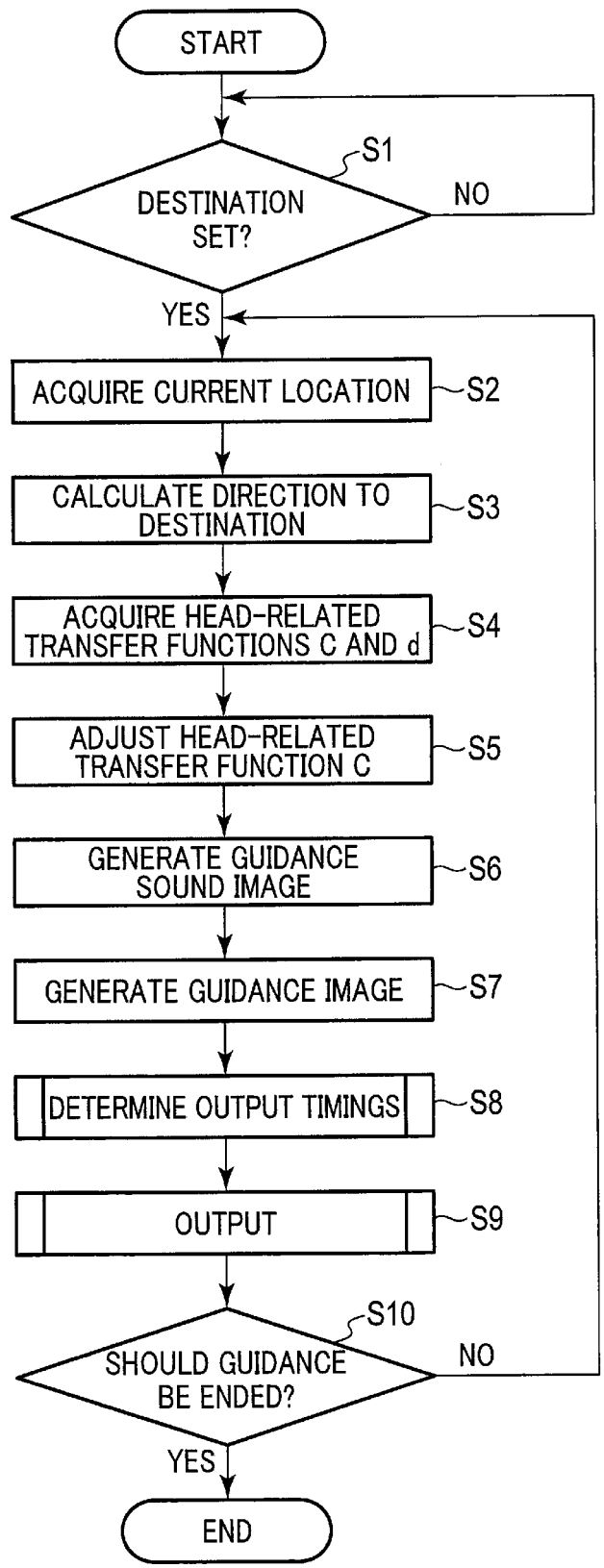
FIG. 4 is a flowchart illustrating an operation of the reproducing apparatus according to the first embodiment.

According to one embodiment, a reproducing apparatus includes a first sensor, processing circuitry, an audio reproducing device, and an image reproducing device. The first sensor detects a current location of a user. The processing circuitry is configured to acquire a destination, determine a direction of the destination based on the current location, generate a guidance sound image corresponding to a sound image from the direction of the destination, generate a guidance image indicating the direction of the destination, and determine a first output timing, which is an output timing of the guidance sound image, and a second output timing, which is an output timing of the guidance image, in accordance with a state of the user and a state of a surrounding environment of the user. The audio reproducing device reproduces the guidance sound image at the first output timing determined by the processing circuitry to guide the user toward the destination. The image reproducing device configured to reproduce the guidance image at the second output timing determined by the processing circuitry to guide the user toward the destination.

Embodiments will now be described with reference to the accompanying drawings.

First Embodiment

A description will now be given of the first embodiment. FIG. 1 is a diagram showing a configuration of an example of a reproducing apparatus according to each embodiment. The reproducing apparatus 10 includes a speaker 11, a display 12, a camera 13, a first sensor 14, a second sensor 15, an operation unit 16, a memory 17, and processing circuitry 18. The reproducing apparatus 10 is configured, for example, such that it is movable with the user.

FIG. 2 is a diagram showing an application example of the reproducing apparatus 10 according to the first embodiment. The reproducing apparatus 10 is a terminal provided for a cart 20 that is movable, for example, when it is pushed by the user U. The reproducing apparatus 10 effectively links a sound image S and an image I to guide the user in a predetermined direction or calls attention to the predetermined direction to the user. The housing 10a of the reproducing apparatus 10 shown in FIG. 2 may be attached to the cart 20 using, for example, a hinge such that the housing 10a can be tilted in a tilt direction T. The cart 20 may be a cart for commercial use, a cart for use in the logistics industry, a cart for use in the manufacturing industry, a cart for medical use, or the like, and is not limited to any particular type.

As shown in FIG. 2, the speaker 11 is an audio reproducing device provided for the housing 10a of the reproducing apparatus 10. The speaker 11 is a stereo speaker and includes speaker 11a installed on the right side of the housing 10a of the reproducing apparatus 10 and speaker 11b installed on the left side of the housing 10a of the reproducing apparatus 10.

The display 12 is an image reproducing device provided on the housing 10a of the reproducing apparatus 10. The display 12 may be one of various types of display, including a liquid crystal display and an organic EL display.

The camera 13 is provided on the housing 10a of the reproducing apparatus 10, and generates an image by imaging. The camera 13 includes, for example, two cameras. FIG. 3 is a diagram showing how a first camera 13a and a second camera 13b are arranged. The first camera 13a is provided on the housing 10a such that it is located on the side opposite to the traveling direction D1 of the cart 20, that is, on the side of the user U. The first camera 13a images the direction D2 of the user U. As shown in FIG. 3, the second camera 13b is provided on the housing 10a such that it is located on the same side as the traveling direction D1 of the cart 20. The second camera 13b images the traveling direction D3 of the cart 20.

The first sensor 14 is a sensor that detects the present location of the reproducing apparatus 10, that is, the current location of the user who moves together with the reproducing apparatus 10. The first sensor 14 is, for example, a GPS receiver and detects radio waves transmitted from a plurality of radio wave transmitters such as artificial satellites. Where it is conceivable that the cart 20 is used indoors, the first sensor 14 may be configured to detect radio waves transmitted from a plurality of access points of a wireless LAN installed indoors or the like. The first sensor 14 is not limited to any particular sensor as long as it is a sensor capable of detecting the current position of the user.

The second sensor 15 detects the attitude of the housing 10a of the reproducing apparatus 10, that is, the attitude of the speaker 11 provided for the housing 10a. The second sensor 15 is, for example, an angle sensor provided for the hinge that attaches the housing 10a and the cart 20 to each other. The second sensor 15 is not limited to any particular sensor as long as it is a sensor capable of detecting the attitude of the speaker 11. For example, the second sensor 15 may be a triaxial acceleration sensor or the like provided for the housing 10a.

The operation unit 16 includes various operation members for the user to operate the reproducing apparatus 10. The operation unit 16 is, for example, a touch panel integral with the display 12. The operation unit 16 may include operation members other than the touch panel, such as buttons, switches, and dials. The operation unit 16 may include an audio input device such as a microphone.

The memory 17 stores, in a nonvolatile manner, sound for generating a sound image to be reproduced by the speaker 11. This sound is, for example, an alarm sound, but is not limited thereto. The sound may be voice or the like indicating the direction of a destination. The sound may be recorded as binaural sound. The binaural sound is, for example, a sound obtained by recording a sound generated from a known direction and distance in a dummy head that is configured to reproduce an acoustic effect similar to that on the human head.

The memory 17 stores images reproduced on the display 12 in a nonvolatile manner. The images are those for guiding the user in a predetermined direction, for example, arrow images showing directions, but are not limited to such images.

The memory 17 also stores head-related transfer function C, which indicates transfer characteristics of sound between the speaker 11 and the user's head (ears), as a database. Head-related transfer function C is represented by a matrix having such elements as spatial transfer characteristic $C_{RR}$ of sound transferred from the right-side speaker 11a to the user's right ear, spatial transfer characteristic $C_{RL}$ of sound transferred from the right-side speaker 11a to the user's left ear, spatial transfer characteristic $C_{LR}$ of sound transferred from the left-side speaker 11b to the user's right ear, and spatial transfer characteristic $C_{LL}$ of sound transferred from the left-side speaker 11b to the user's left ear. The memory 17 stores, as a database, head-related transfer function d, which is a transfer characteristic of sound between a virtual sound source and the user's head (ears), where the positional relationship between the position of the user and the virtual sound source set as a destination is set to a predetermined positional relationship. Head-related transfer function d is represented by a matrix having such elements as spatial transfer characteristic $d_R$ of sound transferred to the right ear of the user assumed to be located at a predetermined place from the virtual sound source and spatial transfer characteristic $d_L$ of sound transferred to the left ear of that user.

It should be noted that the memory 17 may be a single memory; alternatively, a plurality of memories may be used.

The processing circuitry 18 includes a digital signal processor, such as a CPU, an ASIC, an FPGA, or a DSP, and controls the operation of the reproducing apparatus 10. The processing circuitry 18 generates sound images and images used for guiding the user. The processing circuitry 18 determines output timings of sound images by the speaker 11 and output timings of images by the display 12, in accordance with the state of the user and the state of the surrounding environment of the user. It should be noted that the processing circuitry 18 may be a single CPU or the like; alternatively, a plurality of CPUs or the like may be used.

FIG. 4 is a flowchart illustrating an operation of the reproducing apparatus 10 according to the first embodiment. The processing shown in FIG. 4 is controlled by the processing circuitry 18. The processing described below is performed, for example, at the timing when the user has moved a predetermined distance (for example, several meters).

In step S1, the processing circuitry 18 determines whether or not a destination has been set. The destination is set, for example, when the user operates the touch panel or inputs a voice from the microphone. In this case, the user selects a desired destination, for example, from preset destinations. In order to guide the user to a specific place or call the user's attention to a specific direction, the processing circuitry 18 may automatically set a destination. The determination in step S1 is repeated until a destination is set. If it is determined in step S1 that the destination has been set, the processing proceeds to step S2.

In step S2, the processing circuitry 18 acquires the current location of the reproducing apparatus 10 from outputs of the first sensor 14.

In step S3, the processing circuitry 18 calculates a direction from the current position toward the destination. The direction toward the destination is calculated as the direction of the vector corresponding to the difference between the coordinates of the destination and the coordinates of the current position.

In step S4, the processing circuitry 18 acquires head-related transfer function C from the memory 17. Also, the processing circuitry 18 acquires head-related transfer function d corresponding to the calculated direction from the memory 17.

In step S5, the processing circuitry 18 adjusts head-related transfer function C in accordance with the attitude of the speaker 11 and the attitude of the user.

Figure 5A:
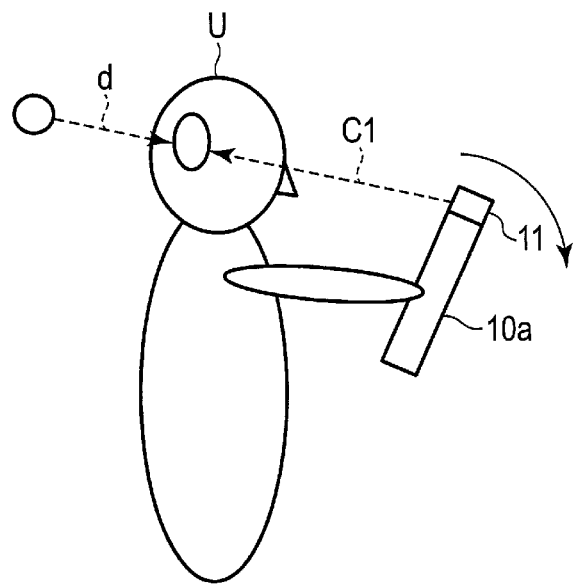
FIG. 5A is a diagram illustrating the concept underlying the adjustment of head-related transfer function C.
Figure 5B:
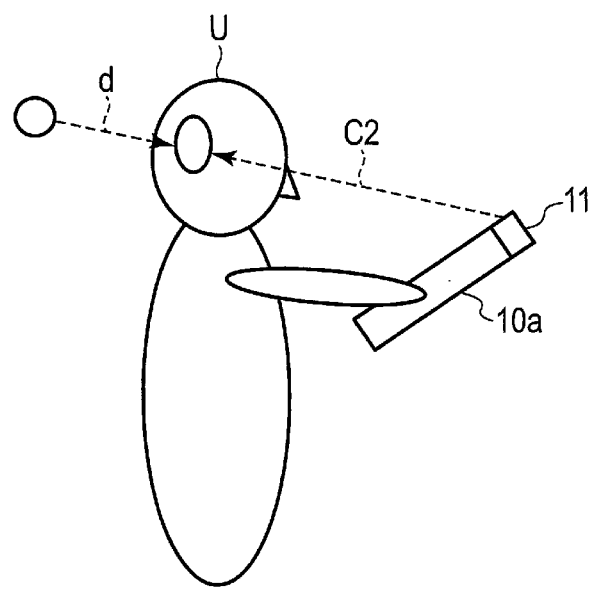
FIG. 5B is a diagram illustrating the concept underlying the adjustment of head-related transfer function C.

FIGS. 5A and 5B are diagrams illustrating the concept underlying the adjustment of head-related transfer function C. FIG. 5A shows a state in which a user U having a certain height gazes at the display 12 at an angle of the housing 10a. Suppose head-related transfer function C1 of the state of FIG. 5A is stored in the memory 17 as a fixed value.

If the user changes the direction of the housing 10a to the direction shown in FIG. 5B, the relative position between the speaker 11 and the head portion of the user U changes. At this time, head-related transfer function C changes from head-related transfer function C1 to head-related transfer function C2. Therefore, in order to reproduce a stable sound image, it is desirable that head-related transfer function C1 is robustly adjusted in accordance with the relative attitude between the speaker 11 and the user U. For this reason, the processing circuitry 18 calculates head-related transfer function C2, based on the change in the relative position between the speaker 11 and the user's head, that is, based on the change in the attitude of the speaker 11 and head-related transfer function C1. The attitude of the speaker 11 is detected, for example, from the attitude of the housing 10a detected by the second sensor 15.

As a specific adjustment method of head-related transfer function C, the method disclosed, for example, in Japanese Patent No. 5944567 can be used. Needless to say, a specific adjustment method of head-related transfer function C is not limited to the method disclosed in Japanese Patent No. 5944567. In addition to head-related transfer function C, head-related transfer function d may also be adjusted.

The relative position between the speaker 11 and the head of the user may also change due to a change in the attitude of the head of the user U. Even if the head of the user U does not move, the relative position between the speaker 11 and the head of the user may change depending on a change in the height of the user. Therefore, it is preferable that head-related transfer function C is adjusted in consideration of a change in the attitude of the head of the user U as well. The attitude of the head of the user U is detected, for example, from the user's image acquired by the first camera 13a. Assuming that the user U is facing the display 12, the attitude of the head of the user U may be estimated from the attitude of the housing 10a detected by the second sensor 15.

In step S6, the processing circuitry 18 generates a guidance sound image. The guidance sound image includes aright sound signal corresponding to the right-side speaker 11a and a left sound signal corresponding to the left-side speaker 11b. This guidance sound image is generated by applying a control filter corresponding to the direction of the destination to the sound to be reproduced. The control filter is calculated, for example, by multiplying the inverse matrix $C^{-1}$ of head-related transfer function C by head-related transfer function d from the right.

In step S7, the processing circuitry 18 generates a guidance image. The guidance image is generated by acquiring an image showing the direction of the destination from the memory 17. The guidance image may be generated, for example, by rotating an arrow image in accordance with the direction of the destination. Further, the guidance image may be generated as an AR (augmented reality) image by superimposition on the image obtained by the second camera 13b and indicating the moving direction of the user.

In step S8, the processing circuitry 18 performs output timing determination processing. The output timing determination processing is a process of determining the output timing of a guidance sound image and the output timing of a guidance image. The output timing includes presence/absence of an output and a delay time. Details of the output timing determination processing will be described later.

In step S9, the processing circuitry 18 performs output processing. The output processing is a process of outputting a guidance sound image and a guidance image at the output timing determined in the output timing determination processing. Details of the output processing will be described later.

In step S10, the processing circuitry 18 determines whether or not the guidance should be ended. For example, where the current position agrees with the destination, it is determined that the guidance should be ended. The agreement mentioned here does not have to be an exact one. If it is determined in step S10 that the guidance should not be ended, then the processing returns to step S2. If it is determined in step S10 that the guidance should be ended, the processing shown in FIG. 4 is ended.

FIG. 6 is a flowchart illustrating an example of output determination processing. In step S101, the processing circuitry 18 determines whether or not the user is wondering which way to take. If it is determined in step S101 that he user is wondering which way to take, the processing proceeds to step S102. If it is determined in step S101 that he user is not wondering which way to take, the processing proceeds to step S103.

Whether or not the user knows the way to take is determined, for example, by the number of times the user gazes at the display 12 within a predetermined time, the number of times the user changes the direction of the head within the predetermined time, and the number of times the destination direction is changed within the predetermined time.

The number of times the display 12 is gazed at can be estimated by detecting the user's gaze direction from the image of the user acquired by the first camera 13a. If the number of times the user gazes at the display 12 within the predetermined time exceeds a preset number of times (for example, 10 times), then it is determined that the user is wondering which way to take.

The number of times the user changes the direction of the head can be estimated based on the image of the user acquired by the first camera 13a. If the number of times the user changes the direction of the head within the predetermined time exceeds a preset number of times (for example, 10 times), then it is determined that the user is wondering which way to take.

Figure 7A:
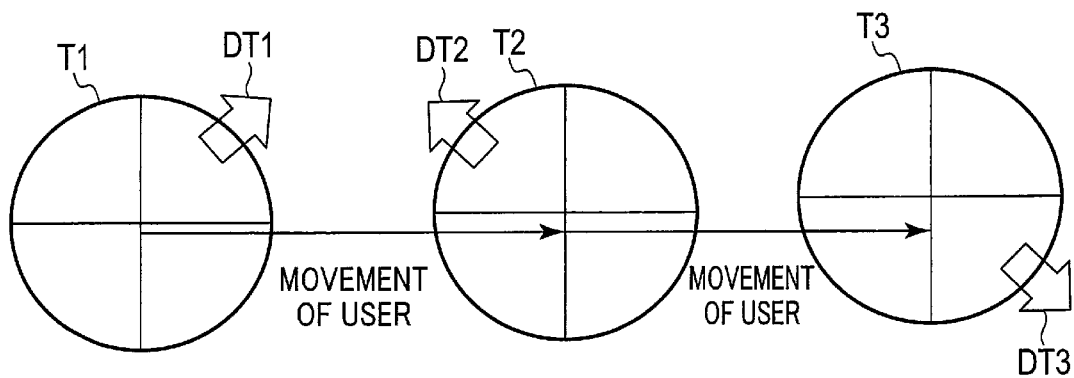
FIG. 7A is a diagram for illustrating a determination whether the user is wondering which way to take.
Figure 7B:
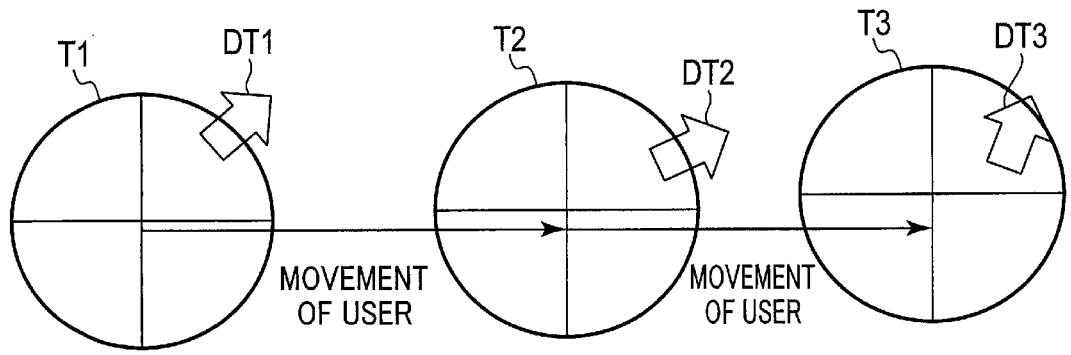
FIG. 7B is a diagram for illustrating a determination whether the user is wondering which way to take.

If the number of times the user changes the destination direction within the predetermined time exceeds a preset number of times (for example, 3 times), then it is determined that the user is wondering which way to take. A state in which the destination direction is changing is, for example, a state in which the destination directions are not within the same quadrant. For example, the processing circuitry 18 determines whether or not the destination directions calculated at past timings T1, T2 and T3 have changed. If, as shown in FIG. 7A, three consecutive destination directions DT1, DT2 and DT3 are in different quadrants, the processing circuitry 18 determines that the user is wondering which way to take. Even if the destination directions DT1, DT2 and DT3 change to some extent, as shown in FIG. 7B, the processing circuitry 18 determines that the user is not wondering which way to take as long as they are in the same quadrant.

In step S102, the processing circuitry 18 validates the output of guidance sound images and invalidates the output of guidance images. Then, the processing shown in FIG. 6 is ended. For example, let it be assumed that y1 is a voice signal (right side and left side) representing a generated guidance sound image, y2 is an image signal representing a generated guidance image, a is an output weight of the image and sound image ($0 \leq a \leq 1$), and the combined output Y of the sound image and image is defined by Formula 1 set forth below. In step S102, the processing circuitry 18 sets the output weight a to "1". In step S102, it is presumed that the user is wondering which way to take. For this reason, if both the guidance sound image and the guidance image are presented, there is a possibility that the user will be confused by them. Therefore, while it is presumed that the user is wondering which way to take, the user should be guided only with sound images until the user can be guided based on the correct route. Where the output weight is "1", a maximum volume sound is output from the speaker 11 in the output processing to be described later. On the other hand, the brightness of the guidance image displayed on the display 12 is minimized. Although reference is made to the case where the guidance is performed only with sound images, the guidance may be performed only with images, that is, the output weight a may be set to 0. In this case, in order to cause the user to gaze at the display 12, a sound image corresponding to the forward direction of the cart 20, namely the direction to the display 12, may be reproduced prior to the guidance based only on images.

$$Y = a \cdot y1 + (1-a) \cdot y2 \quad \text{(Formula 1)}$$

In step S103, the processing circuitry 18 determines whether or not the moving speed V of the user exceeds a predetermined speed. The moving speed V of the user can be calculated from the change amount of the current position. The predetermined speed is a speed at which the user can be regarded as stationary, for example, 5 km/h. If it is determined in step S103 that the moving speed V of the user exceeds the predetermined speed, the processing proceeds to step S104. If it is determined that the moving speed V of the user does not exceed the predetermined speed, the processing proceeds to step S106.

In step S104, the processing circuitry 18 validates the output of guidance sound images and invalidates the output of guidance images. It is not desirable that the user moves while gazing at the screen of the display 12. Therefore, if the moving speed V of the user exceeds the predetermined speed, the guidance based on guidance sound images is performed.

In step S105, the processing circuitry 18 calculates a delay time $\Delta TS$ of guidance sound images. Then, the processing shown in FIG. 6 is ended. There is a possibility that the calculation of sound images cannot be performed in time, depending on the moving speed V of the user. However, even when the user is moving, the user needs guidance only at a place where there are a plurality of destinations, for example, at a corner. Therefore, even when the user is moving without stopping, it is sufficient that a guidance sound image is presented once every few meters or at a specific point such as a corner. Let us assume that a guidance sound image is generated at point A shown in FIG. 8, the user has actually moved to point B before that guidance sound image is reproduced, and the destination direction presented at point B is different from the destination direction calculated at point A. Even in such a case, as long as the moving distance L from point A to point B is about several meters (substantially linear movement during that time), the destination direction presented at point B and the destination direction calculated at point A are very likely to be in the same quadrant. Even if the output timing of guidance sound images is delayed by delay time $\Delta TS$ determined by Formula 2 set forth below, the destination direction presented at point B and the destination direction calculated at point A are in the same quadrant.

$$\Delta TS = L/V \quad \text{(Formula 2)}$$

In step S106, the processing circuitry 18 determines whether or not the amount of noise around the user exceeds a predetermined amount. The amount of noise around the user can be determined, for example, from images obtained by the first camera 13a and the second camera 13b. In other words, if the image of the user and the image of the moving direction of the user include a sound source that causes noise, it is estimated that the amount of noise amount is large. An example of a sound source that causes noise is a person or persons. In this case, where the number of persons appearing in the image exceeds a predetermined number, it is determined that the noise amount is large. Where the reproducing apparatus 10 is provided with a microphone, the processing circuitry 18 may determine whether or not the noise amount exceeds the predetermined amount, based on the loudness level of the surroundings of the user measured by the microphone. If it is determined in step S106 that the noise level around the user exceeds the predetermined amount, the processing proceeds to step S107. If it is determined in step S106 that the noise level around the user does not exceed the predetermined amount, the processing proceeds to step S109. In step S107, the processing circuitry 18 increases the output weight of guidance images. That is, the processing circuitry 18 reduces the value of a. That is, if there is noise around the user, it is hard for the user to hear the sound from the speaker 11. In this case, it is desirable that the guidance is performed mainly by images. The output weight a may be set to a value smaller than 0.5, for example 0.25 or so. In this case, the volume of the sound that is output from the speaker 11 in the subsequent output processing becomes relatively small, and the brightness of the image displayed on the display 12 becomes relatively bright. Needless to say, the output weight a may be set to 0.

Figure 9:
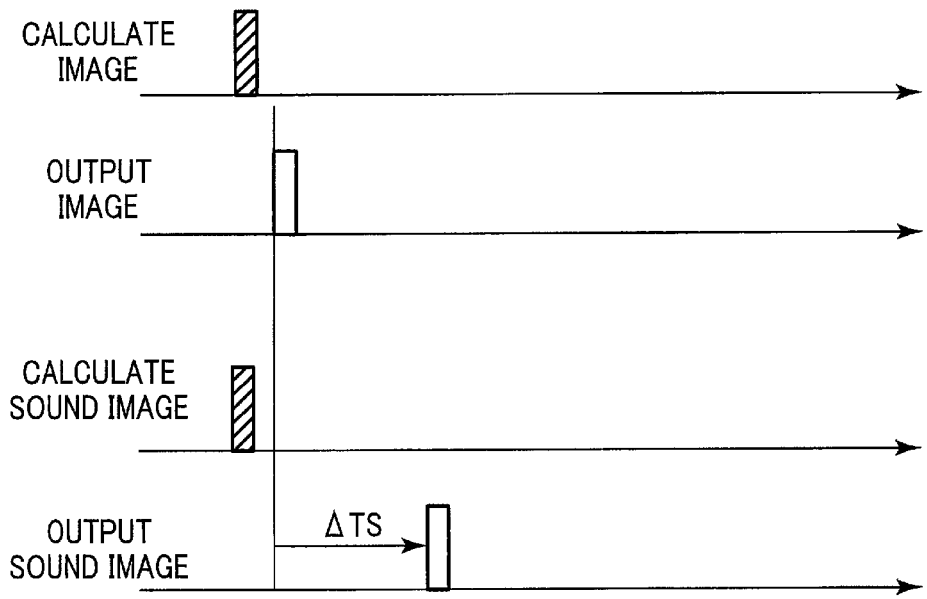
FIG. 9 is a diagram showing how the output timings of a guidance image and a guidance sound image are in a noisy state.

In step S108, the processing circuitry 18 calculates a delay time $\Delta TS$ of guidance sound images. Thereafter, the processing shown in FIG. 6 is ended. In order to perform guidance using mainly images, the output of guidance sound images is delayed with respect to the output of guidance images. At this time, the guidance sound images play an auxiliary role. Delay time $\Delta TS$ may be calculated in the same way as in Formula 2. By setting the delay time $\Delta TS$ in step S108, a guidance sound image is reproduced with a delay of $\Delta TS$ from the reproduction of a guidance image in the output processing described later, as shown in FIG. 9. It should be noted that in step S108, the moving speed V can be zero. If the moving speed V is calculated as being zero in step S108, the delay time $\Delta TS$ is a predetermined fixed time.

In step S109, the processing circuitry 18 determines whether or not there is an obstacle in the direction of the destination. Whether or not such an obstacle is present in the direction of the destination can be determined, for example, from an image obtained by the second camera 13b. Where the processing circuitry 18 stores surrounding map information, the processing circuitry 18 may determine an obstacle present in the direction of the destination, using the map information. If it is determined in step S109 that an obstacle is present in the moving direction of the user, the processing proceeds to step S110. If it is determined in step S109 that no obstacle is present in the moving direction of the user, the processing proceeds to step S112.

In step S110, the processing circuitry 18 increases the output weight of guidance sound images. That is, the processing circuitry 18 increases the value of a. If an obstacle is present in the direction of the destination, the guidance image indicates a direction in which the user cannot actually move. Therefore, the user may be confused. In this case, it is desirable that the guidance is performed mainly by sound images. The output weight a may be set to a value larger than 0.5, for example 0.75 or so. In this case, in the output processing, the volume of the sound that is output from the speaker 11 becomes relatively large, and the brightness of the image displayed on the display 12 becomes relatively dark. Needless to say, the output weight a may be set to 1.

Figure 10:
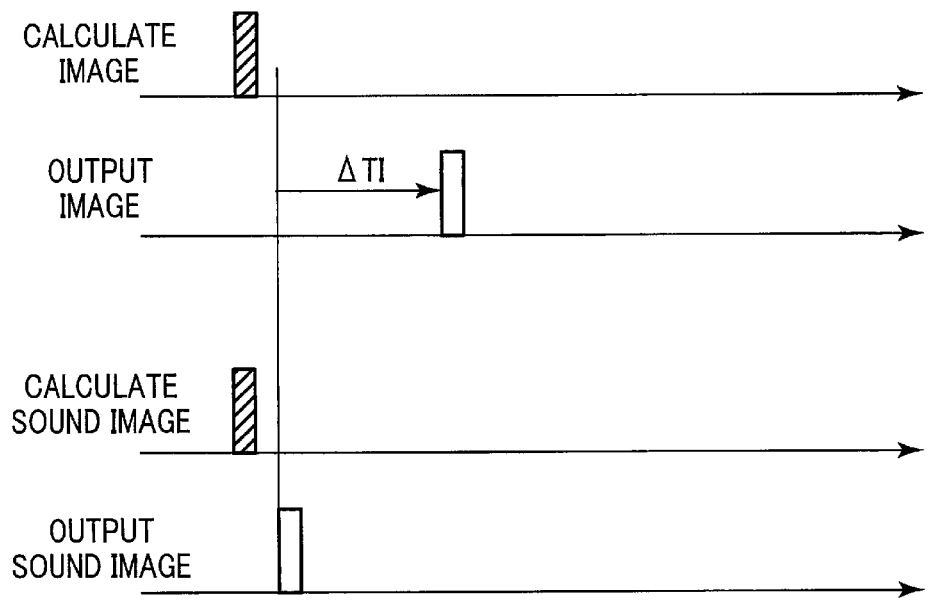
FIG. 10 is a diagram illustrating how the output timings of a guidance sound image and a guidance image are when there is an obstacle.

In step S111, the processing circuitry 18 calculates a delay time $\Delta$TI of guidance images. Then, the processing shown in FIG. 6 is ended. In order to perform guidance using mainly sound images, the output of guidance images is delayed with respect to the output of guidance sound images. At this time, the guidance images play an auxiliary role. Delay time $\Delta$TI may be calculated in the same way as in Formula 2. By setting the delay time $\Delta$TI in step S111, a guidance image is reproduced with a delay of $\Delta$TI from the reproduction of a guidance sound image in the output processing described later, as shown in FIG. 10. It should be noted that in step S111, the moving speed V can be zero. If the moving speed V is calculated as being zero in step S111, the delay time $\Delta$TI is a predetermined fixed time.

In step S112, the processing circuitry 18 equalizes the output weights of both guidance sound images and guidance images. That is, the processing circuitry 18 sets 0.5 as the value of a. Then, the processing shown in FIG. 6 is ended. In situations where the user is not confused, both the guidance by sound images and the guidance by imaged are performed simultaneously. In this manner, the user can be guided to the destination more reliably.

It should be noted that the output determinations shown in FIG. 6 are just examples. Part of the determinations shown in FIG. 6 may be omitted, or other determinations may be added.

FIG. 11 is a flowchart illustrating output processing. In step S201, the processing circuitry 18 determines whether or not delay time $\Delta$TS of guidance sound images is set. If it is determined in step S201 that delay time $\Delta$TS is set, the processing proceeds to step S202. If it is determined in step S201 that delay time $\Delta$TS is not set, the processing proceeds to step S208

In step S202, the processing circuitry 18 determines whether the output of guidance images is valid. If the output weight of guidance images is not 0, it is determined that the output of guidance images is valid. If it is determined in step S202 that the output of guidance images is valid, the processing proceeds to step S203. If it is determined in step S202 that the output of guidance images is not valid, then the processing proceeds to step S206.

In step S203, the processing circuitry 18 causes the display 12 to output a guidance image. Specifically, the processing circuitry 18 inputs a selected guidance image to the display 12. In response to this, the display 12 displays the image with the brightness corresponding to the weight calculated based on Formula 2. In step S204, the processing circuitry 18 stands by for delay time $\Delta$TS. Then, in step S205 after the lapse of the delay time $\Delta$TS, the processing circuitry 18 causes the speaker 11 to output a guidance sound image. More specifically, the processing circuitry 18 inputs a right audio signal to the right-side speaker 11a and a left audio signal to the left-side speaker 11b. In response to this, the right-side speaker 11a and the left-side speaker 11b output sounds according to the weight calculated based on Formula 2 and the weight provided by the control filter. Owing to the sound pressure difference and the time difference (phase difference) between the sounds reproduced by the right-side speaker 11a and the left-side speaker 11b, the user recognizes a sound image equivalent to that reproduced from the predetermined virtual sound source. By the processing shown in steps S203 to S205, the guidance mainly using images and illustrated in FIG. 9 is performed. After the processing of step S205, the processing shown in FIG. 11 is ended.

Figure 8:
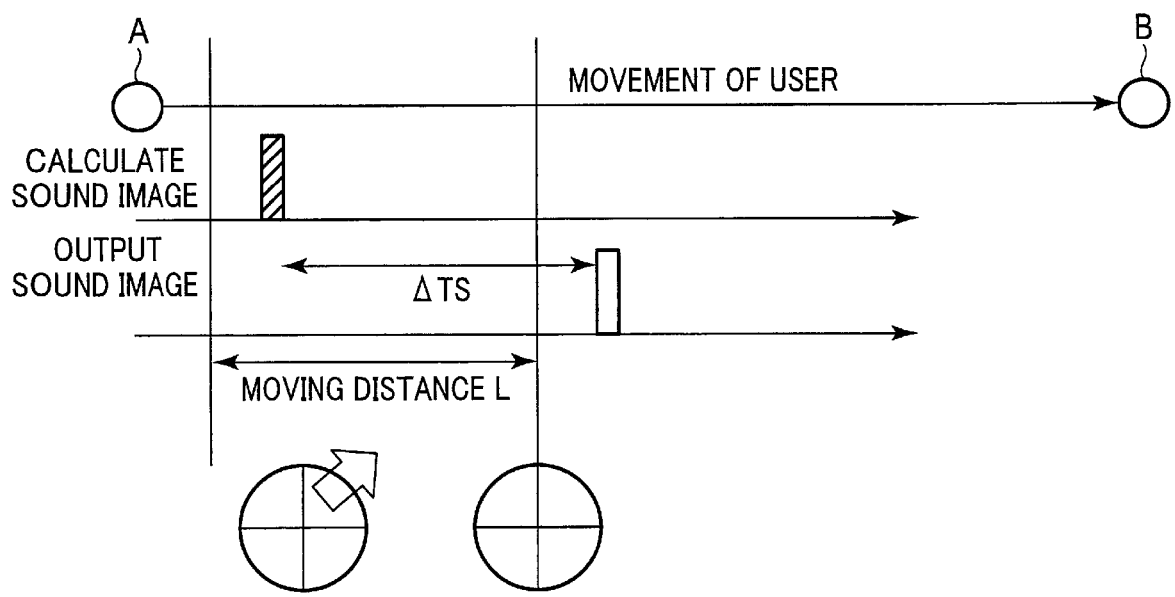
FIG. 8 is a diagram illustrating how the output timing of a guidance sound image is when the user is moving.

In step S206, the processing circuitry 18 stands by for delay time $\Delta$TS. Then, in step S207 after the lapse of the delay time $\Delta$TS, the processing circuitry 18 causes the speaker 11 to output a guidance sound image. More specifically, the processing circuitry 18 inputs a right audio signal to the right-side speaker 11a and a left audio signal to the left-side speaker 11b. In response to this, the right-side speaker 11a and the left-side speaker 11b output sounds according to the weight calculated based on Formula 2 and the weight provided by the control filter. By the processing shown in steps S206 to S207, the guidance using only sound images and illustrated in FIG. 8 is performed. After the processing of step S207, the processing shown in FIG. 11 is ended.

In step S208, the processing circuitry 18 determines whether or not delay time $\Delta$TI of guidance images is set. If it is determined in step S208 that delay time $\Delta$TI is set, the processing proceeds to step S209. If it is determined in step S208 that delay time $\Delta$TI is not set, the processing proceeds to step S215.

In step S209, the processing circuitry 18 determines whether or not the output of guidance sound images is valid. If the output weight of guidance sound images is not 0, it is determined that the output of guidance sound images is valid. If it is determined in step S209 that the output of guidance sound images is valid, the processing proceeds to step S210. If it is determined in step S209 that the output of guidance sound images is not valid, then the processing proceeds to step S213.

In step S210, the processing circuitry 18 causes the speaker 11 to output a guidance sound image. More specifically, the processing circuitry 18 inputs a right audio signal to the right-side speaker 11a and a left audio signal to the left-side speaker 11b. In response to this, the right-side speaker 11a and the left-side speaker 11b output sounds according to the weight calculated based on Formula 2 and the weight provided by the control filter. In step S211, the processing circuitry 18 stands by for delay time $\Delta$TI. Then, in step S212 after the lapse of the delay time $\Delta$TI, the processing circuitry 18 causes the display 12 to output a guidance image. Specifically, the processing circuitry 18 inputs a selected guidance image to the display 12. In response to this, the display 12 displays the image with the brightness corresponding to the weight calculated based on Formula 2. By the processing shown in steps S210 to S212, the guidance mainly using sound images and illustrated in FIG. 10 is performed. After the processing of step S212, the processing shown in FIG. 11 is ended.

In step S213, the processing circuitry 18 stands by for delay time ΔTI. Then, in step S214 after the lapse of the delay time ΔTI, the processing circuitry 18 causes the display 12 to output a guidance image. Specifically, the processing circuitry 18 inputs a selected guidance image to the display 12. In response to this, the display 12 displays the image with the brightness corresponding to the weight calculated based on Formula 2. After the processing of step S214, the processing shown in FIG. 11 is ended.

In step S215, the processing circuitry 18 causes the speaker 11 to output a guidance sound image and causes the display 12 to output a guidance image. More specifically, the processing circuitry 18 inputs a right audio signal to the right-side speaker 11a and a left audio signal to the left-side speaker 11b. Simultaneously, the processing circuitry 18 inputs a selected guidance image to the display 12. In response to this, the right-side speaker 11a and the left-side speaker 11b output sounds according to the weight calculated based on Formula 2 and the weight provided by the control filter, and the display 12 displays an image with the brightness corresponding to the weight calculated based on Formula 2. After the processing of step S215, the processing shown in FIG. 11 is ended.

Figure 12:
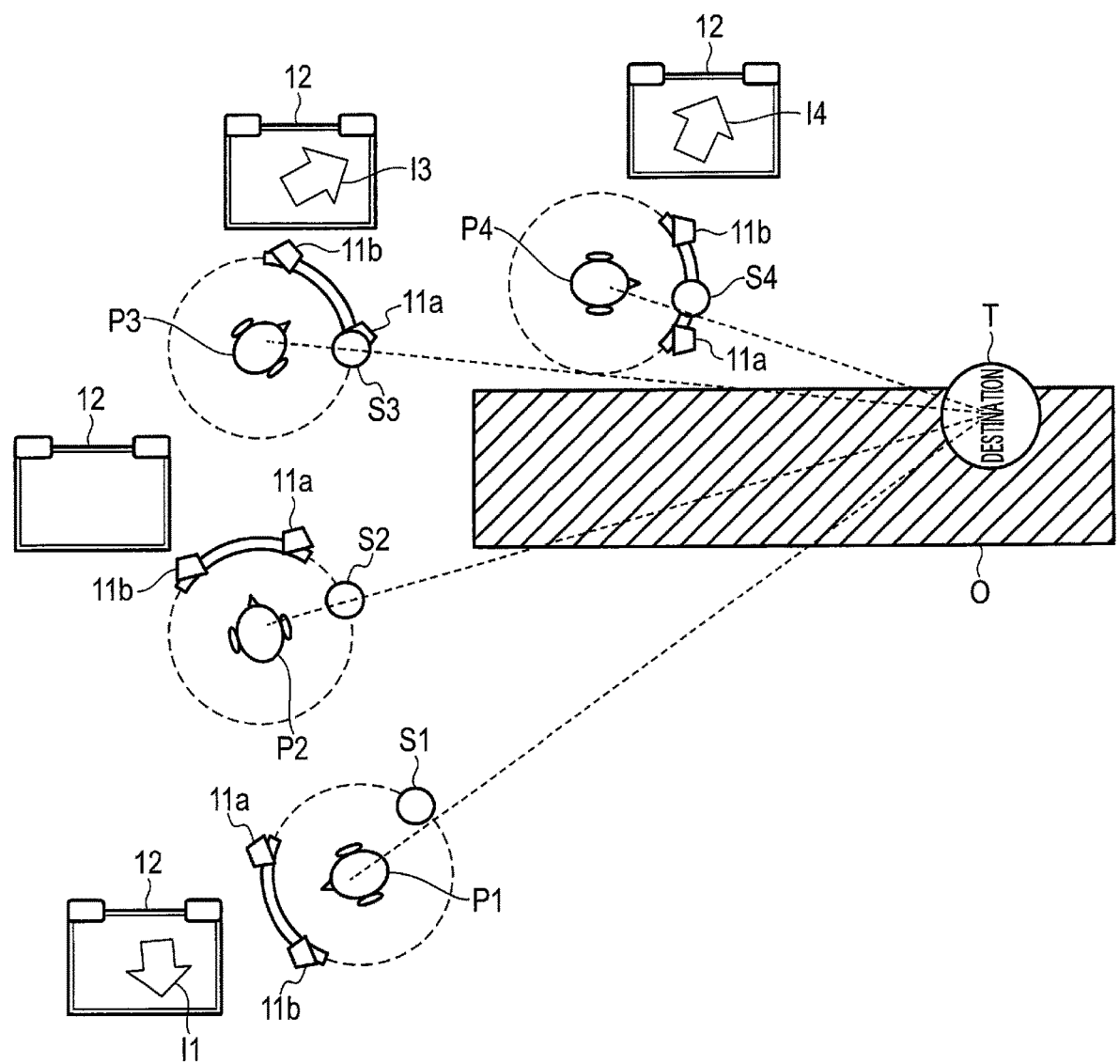
FIG. 12 is a diagram for illustrating the advantages of the first embodiment.

FIG. 12 is a diagram for illustrating the advantages of the present embodiment. In FIG. 12, it is assumed that the user is going to go from point P1 to the destination T.

At point P1, the destination T is located behind the user. Therefore, guidance sound image S1 corresponding to the sound image of the rear region behind the user is reproduced from the speakers 11a and 11b, and guidance image I1, which an arrow image indicating the rear side, is reproduced on the display 12. From the guidance sound image S1 and guidance image I1, the user is allowed to know the direction of the destination T.

Next, it is assumed that the user has moved a predetermined distance (about several meters) and is now at point P2. At point P2, the destination T is located on the right side of the user. Therefore, guidance sound image S2 corresponding to the sound image of the right side of the user is reproduced from the speakers 11a and 11b. It should be noted that an obstacle O exists in the right direction of the user, and the user cannot proceed in the right direction. Therefore, the reproduction of a guidance image on the display 12 is not performed or delayed. By the guidance based only on guidance sound image S2, the user is allowed to know the direction of the destination T and is not confused about the moving direction.

Next, it is assumed that the user has moved a predetermined distance (about several meters) and is now at point P3. At point P3, the destination T is located diagonally forward right of the user. Therefore, guidance sound image S3 corresponding to the sound image of the diagonally forward right region of the user is reproduced from the speakers 11a and 11b, and guidance image I3, which an arrow image indicating the diagonally forward right region, is reproduced on the display 12. Since, at point P3, there is no obstacle O in the moving direction of the user, the guidance sound image S3 and the guidance image I3 are reproduced simultaneously.

Next, it is assumed that the user has moved a predetermined distance (about several meters) and is now at point P4. At point P4, the destination T is located diagonally forward right of the user. Therefore, guidance sound image S4 corresponding to the sound image of the diagonally forward right of the user is reproduced from the speakers 11a and 11b, and guidance image I4, which is an arrow image indicating the diagonally forward right region is reproduced on the display 12. From the guidance sound image S4 and guidance image I4, the user is allowed to know the direction of the destination T.

In the above manner, according to the present embodiment, the guidance based on sound images and the guidance based on images are in conjunction with each other, so that the user is guided to the destination more reliably. Further, according to the present embodiment, the output timing of guidance sound images and the output timing of guidance images are determined from moment to moment. If it is determined that the presentation of both a guidance sound image and a guidance image confuses the user, the guidance based mainly on sound images or the guidance based mainly on images is carried out. Thus, the user can be guided to the destination without being confused.

According to the present embodiment, the reproducing apparatus 10 including the speaker 11 is attached to the cart 20. Since the reproducing apparatus 10 is attached to the cart 20, the relative position between the head of the user and the speaker 11 is easily maintained. Therefore, even if head-related transfer function C is a fixed value, sound images can be reproduced in a stable manner. Even if the relative position between the head of the user and the speaker 11 changes, head-related transfer function C is robustly adjusted in accordance with the change, so that stable reproduction of sound images is enabled even if the relative position between the head of the user and the speaker 11 changes.

Modification 1 of the First Embodiment

Figure 13A:
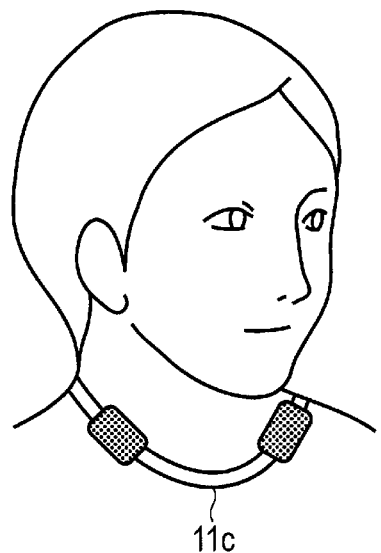
FIG. 13A is a view showing a neckband speaker which is a modification example of an audio reproducing device.
Figure 13B:
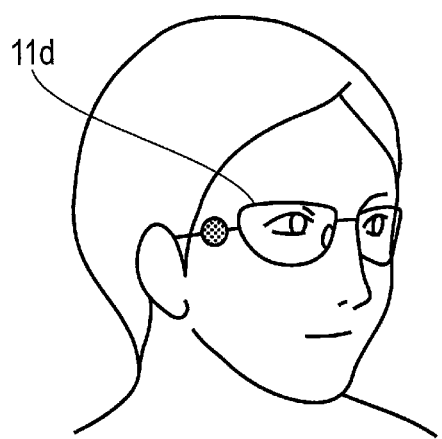
FIG. 13B is a view showing speaker-incorporated eyeglasses as a modification example of the audio reproducing device.

A modification of the first embodiment will be described. In the embodiment described above, sound images are reproduced from the speaker 11 attached to the cart 20. The audio reproducing device for reproducing sound images need not necessarily be a speaker attached to the cart 20. For example, the audio reproducing device may be provided independently of the reproducing apparatus 10. The audio reproducing device provided independently of the reproducing apparatus 10 may be, for example, a neckband speaker 11c worn on the neck, such as that shown in FIG. 13A, or glasses incorporating a speaker 11d, such as those shown in FIG. 13B. Furthermore, the audio reproducing device may be an earphone, a headphone, or the like. In comparison with the speaker attached to the cart 20, these types of audio reproducing devices enable the relative position with respect to the user's head to be easily maintained. Accordingly, head-related transfer function C can be easily adjusted.

Figure 14:
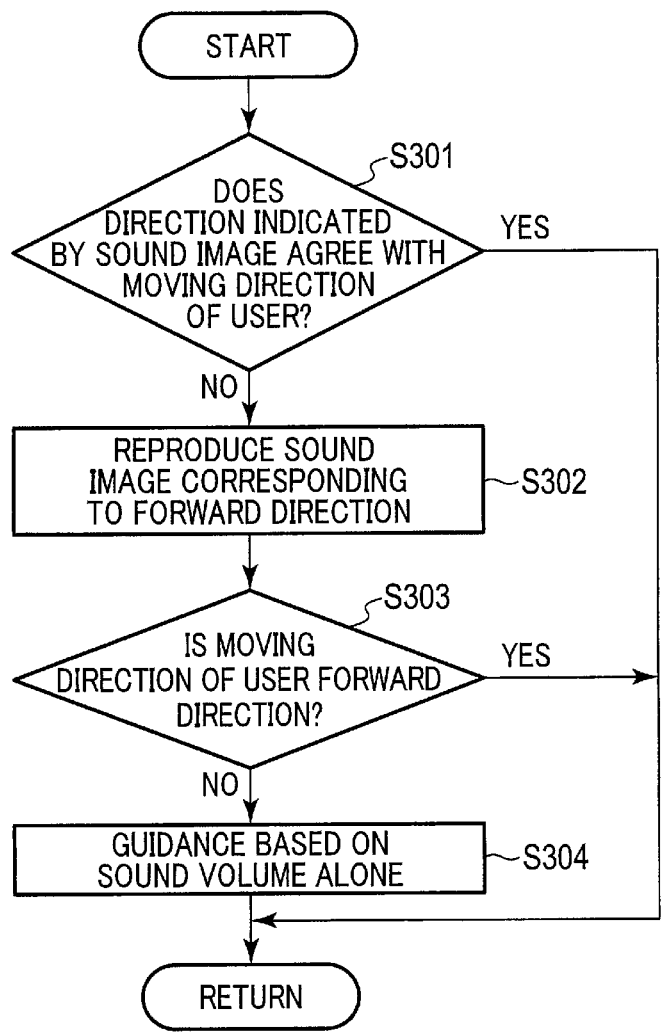
FIG. 14 is a flowchart illustrating the processing in which the attachment of the audio reproducing device is detected.

In the case of an audio reproducing device worn on the user as described in modification 1, stable reproduction of sound images is hard to perform if the audio reproducing device is not properly worn on the user. It is therefore desirable that the reproducing apparatus 10 can detect whether the user properly wears the audio reproducing device. FIG. 14 is a flowchart illustrating the processing in which the attachment of the audio reproducing device is detected. The processing shown in FIG. 14 is performed, for example, prior to the generation of a guidance sound image illustrated in FIG. 4.

In step S301, the processing circuitry 18 determines whether the direction indicated by the guidance sound image previously presented to the user agrees with the actual moving direction of the user. The movement direction of the user is detected from changes in the current position. Whether or not the direction indicated by the guidance sound image agrees with the actual moving direction of the user may be determined by checking whether or not the direction indicated by the guidance sound image and the moving direction of the user are within the same quadrant, as in the aforementioned determination made as to whether or not the destination direction changes. For example, if the direction indicated by the guidance sound image and the moving direction of the user are successively detected as being indifferent quadrants three times, the processing circuitry 18 determines that the direction indicated by the guidance sound image does not agree with the actual moving direction of the user. If it is determined in step S301 that the direction indicated by the guidance sound image agrees with the actual moving direction of the user, the processing shown in FIG. 14 is ended. In this case, the guidance based on guidance sound images is performed. If it is determined in step S301 that the direction indicated by the guidance sound image does not agree with the actual moving direction of the user, the processing proceeds to step 302.

In step S302, the processing circuitry 18 controls the speakers 11a and 11b such that a sound image corresponding to the forward direction of the cart 20 can be reproduced. At this time, the sound to be reproduced is, for example, a voice prompting confirmation of wearing the audio reproducing device. In other words, since the guidance by a sound image may not be correctly performed and the sound reproducing device may not be worn properly, the user is prompted to wear the sound reproducing device. Head-related transfer functions C and d for generating a sound image corresponding to the forward direction of the cart 20 are stored in advance in the memory 17, for example. Hearing the sound image, the user confirms attachment of the sound reproducing device, and wears the sound reproducing device properly, when necessary.

In step S303, the processing circuitry 18 determines whether or not the moving direction of the user agrees with the forward direction of the cart 20, that is, the direction indicated by the current sound image. If it is determined in step S303 that the moving direction of the user agrees with the forward direction of the cart 20, the processing shown in FIG. 14 is ended. In this case, the guidance based on guidance sound images is resumed. If it is determined in step S303 that the moving direction of the user does not agree with the forward direction of the cart 20, the processing proceeds to step S304.

In step S304, the processing circuitry 18 switches from the guidance based on sound images to the guidance based on sound volume differences. Then, the processing shown in FIG. 14 is ended. More specifically, if the direction of the destination is the right direction, the processing circuitry 18 performs control such that the volume of the sound output from speaker 11a is increased. If the direction of the destination is the left direction, the processing circuitry 18 performs control such that the volume of the sound output from speaker 11b is increased. If the direction of the destination is the forward direction, the processing circuitry 18 performs control such that the volume of the sound output from speaker 11a and the volume of the sound output from speaker 11b are made equal. With the guidance based on the sound volume differences, the user cannot be guided in the forward/rearward direction, but reproduction of inappropriate sound images is suppressed and the possibility of confusion given to the user is therefore reduced.

According to the modification described above, sound images can be reproduced more stably, and reproduction of inappropriate sound images is prevented, thereby preventing the user from being confused by such inappropriate sound images.

Modification 2 of the First Embodiment

Although the above-described reproducing apparatus 10 is attached to the cart 20, the reproducing apparatus 10 does not necessarily have to be attached to the cart 20. The reproducing apparatus 10 may be a terminal including a speaker and a display, such as a smartphone or a tablet PC.

In addition, since the first sensor 14 is only required to detect the current location of the user, it does not necessarily have to be provided for the reproducing apparatus 10. The first sensor 14 may be, for example, a sensor worn by a user.

Further, the first camera 13a and the second camera 13b do not necessarily have to be provided for the reproducing apparatus 10, and may be provided independently of the reproducing apparatus 10. Instead of employing the two cameras, the first camera 13a and the second camera 13b, a single camera having a wide view angle lens, such as a fisheye lens, may be installed in the reproducing apparatus 10.

Second Embodiment

A description will now be given of the second embodiment. FIG. 15 is a diagram showing an application example of a reproducing apparatus according to the second embodiment. The configuration of the reproducing apparatus may be similar to that described with reference to FIGS. 1 and 3. Therefore, a description of the detailed configuration of the reproducing apparatus will be omitted.

The reproducing apparatus 10 of the second embodiment is a terminal including a speaker and a display, such as a smartphone or a tablet PC. The reproducing apparatus 10 is applied, for example, to an inspection apparatus used for inspecting a product. The user U directs the reproducing apparatus 10 towards a target product. At this time, the reproducing apparatus 10 causes the second camera 13b (not shown in FIG. 15) to capture an image of the front, thereby acquiring an image of the view direction of the user. Then, the reproducing apparatus 10 causes the display 12 to display an image of the viewing direction of the user.

Where a predetermined inspection portion is included in the image obtained by the second camera 13b, the reproducing apparatus 10 displays an AR marker as a guidance image at a position corresponding to the inspection portion in the image displayed on the display 12. FIG. 15 shows an example in which the image displayed on the display 12 includes two inspection portions, namely, inspection step 1 and inspection step 2. In this case, the reproducing apparatus 10 displays AR markers I1 and I2 at the respective two inspection portions.

Also, the reproducing apparatus 10 can determine whether or not there is a predetermined inspection portion outside the image obtained by the second camera 13b. Where such a predetermined inspection portion exists outside the image, the reproducing apparatus 10 controls the speakers 11a and 11b such that a sound image corresponding to the direction of the inspection portion is reproduced. FIG. 15 shows an example in which an inspection part of step 3 exists outside the image displayed on the display 12. In this case, the reproducing apparatus 10 reproduces a sound image S indicating the direction of inspection step 3.

FIG. 16 is a flowchart illustrating an operation of the reproducing apparatus 10 according to the second embodiment. In step S401, the processing circuitry 18 causes the display 12 to display an image of the view direction of the user obtained by the second camera 13b.

In step S402, the processing circuitry 18 determines whether or not there is a predetermined inspection portion included in the image obtained by the second camera the image obtained by the second camera 13b. The presence or absence of the inspection portion in the image is determined, for example, from the coordinate information of the inspection portion. If the coordinates of the inspection portion are present in the imaging direction of the second camera 13b, it is determined that the image obtained by the second camera 13b includes the predetermined inspection portion. The imaging direction of the second camera 13b can be estimated from the attitude of the housing 10a of the reproducing apparatus 10 detected by the second sensor 15 and the angle of view of the second camera 13b. If it is determined in step S402 that there is a predetermined inspection portion included in the image obtained by the second camera 13b, the processing proceeds to step S403. If it is determined in step S402 that there is a predetermined inspection portion included in the image obtained by the second camera 13b, the processing proceeds to step S404.

In step S403, the processing circuitry 18 causes an AR marker to be displayed as a guidance image at that position of the image corresponding to the inspection portion. The AR marker may be an image that emphasizes the inspection portion, an image indicating the number of an inspection step, an arrow image, or the like.

In step S404, the processing circuitry 18 determines whether or not there is a predetermined inspection portion outside the image obtained by the second camera 13b. Whether or not the inspection portion is outside the image is determined, for example, from the coordinate information of the inspection portion. If the coordinates of the inspection portion are not present in the imaging direction of the second camera 13b, it is determined that there is a predetermined inspection portion outside the image obtained by the second camera 13b. If it is determined in step S404 that there is a predetermined inspection portion outside the image obtained by the second camera 13b, the processing proceeds to step S405. If it is determined in step S404 that there is not a predetermined inspection portion outside the image obtained by the second camera 13b, the processing proceeds to step S406.

In step S405, the processing circuitry 18 generates a guidance sound image corresponding to the direction and distance of the inspection portion that is outside the image. Then, the processing circuitry 18 controls the speakers 11a and 11b to reproduce the guidance sound image. Subsequently, the processing proceeds to step S406. The sound reproduced as a guidance sound image may be, for example, an alarm.

In step S406, the processing circuitry 18 determines whether or not the inspection should be ended. For example, if the end of inspection is instructed by a user's operation of the operation unit 16, it is determined that the inspection should be ended. If it is determined in step S406 that the inspection should not be ended, then the processing returns to step S401. If it is determined in step S406 that the inspection should be ended, the processing shown in FIG. 16 is ended.

As described above, according to the second embodiment, a range that cannot be guided by images can be covered by the guidance by sound images. If a product to be inspected is large and the inspection steps are many, it is difficult to check all inspection points at one time on the display 12.

According to the second embodiment, even an inspection portion that is outside the display range of the display 12 can be confirmed based on a sound image.

In connection with the second embodiment, the output timing of a sound image and the output timing of an image are not particularly mentioned. The output timing of a sound image and the output timing of an image may be the same or different. For example, the output timing of a sound image may be delayed in accordance with the moving speed of the housing 10a of the reproducing apparatus 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reproducing apparatus comprising:
a first sensor configured to detect a current location of a user;
processing circuitry configured to:
acquire a destination;
determine a direction of the destination from the current location;
generate a guidance sound image corresponding to a sound image from the direction of the destination, the guidance sound image is a sound to which a sound volume difference and a phase difference are added in accordance with a distance between the user and a virtual sound source;
generate a guidance image indicating the direction of the destination; and
determine a first output timing, which is an output timing of the guidance sound image, and a second output timing, which is an output timing of the guidance image, in accordance with a state of the user and a state of a surrounding environment of the user;
an audio reproducing device configured to reproduce the guidance sound image at the first output timing determined by the processing circuitry to guide the user toward the destination; and
an image reproducing device configured to reproduce the guidance image at the second output timing determined by the processing circuitry to guide the user toward the destination,
wherein the processing circuitry:
invalidates the first output timing and validating the second output timing when guidance by the guidance sound image is not suitable;
validates the first output timing and invalidates the second output timing when guidance by the guidance image is not suitable; and
validates both the first output timing and the second output timing when the guidance by the guidance sound image and the guidance by the guidance image are suitable.

2. The reproducing apparatus according to claim 1, wherein the processing circuitry validates one of the first output timing and the second output timing, when at least one of a number of times the user gazes at the image reproducing device within a predetermined time, a number of times a head of the user moves within a predetermined time, a number of times a moving direction of the user becomes different from the direction of the destination within a predetermined time exceeds a predetermined number of times.

3. The reproducing apparatus according to claim 2, wherein the processing circuitry validates the first output timing and changes a direction of the guidance sound image to a direction of the image reproducing device, and then invalidates the first output timing and validates the second output timing.

4. The reproducing apparatus according to claim 2, further comprising:
   a first camera provided on a same side of a housing of the reproducing apparatus as the image reproducing device and configured to image a direction of the user to acquire a first image,
   wherein the processing circuitry determines the number of times the user gazes at the image reproducing device and the number of times the head of the user moves, based on the first image.

5. The reproducing apparatus according to claim 1, wherein the processing circuitry invalidates the second output timing and validates the first output timing, when a moving speed of the user exceeds a predetermined speed.

6. The reproducing apparatus according to claim 1, wherein the processing circuitry delays the first output timing with respect to the second output timing when a noise amount around the user exceeds a predetermined amount.

7. The reproducing apparatus according to claim 1 wherein the processing circuitry delays the second output timing with respect to the first output timing when an obstacle is present in a moving direction of the user.

8. The reproducing apparatus according to claim 1, further comprising:
   a second camera provided on a side of a housing of the reproducing apparatus which is opposite to the image reproducing device and configured to image a moving direction of the user to acquire a second image,
   wherein the processing circuitry generates the guidance image by superimposing an image indicating the direction of the destination on the second image.

9. The reproducing apparatus according to claim 1, wherein the reproducing apparatus is attached to a cart such that a relative distance with respect to the user is maintained, and
   the processing circuitry adjusts a head-related transfer function for generating the guidance sound image in accordance with a relative positional relationship between the audio reproducing device and a head of the user.

10. The reproducing apparatus according to claim 1, wherein the audio reproducing device is worn by the user, and
   the processing circuitry
   compares a direction indicated by the guidance sound image with a moving direction of the user,
   prompts the user to properly wear the audio reproducing device, when the direction indicated by the guidance sound image does not agree with the moving direction of the user, and
   switches guidance of the user based on the guidance sound image to guidance of the user based only on a volume difference, when the direction indicated by the guidance sound image is still different from the moving direction of the user even after proper wearing is prompted.

* * * * *